F. E. SHAHAN.
ROD PACKING.
APPLICATION FILED APR. 19, 1912.
1,035,484.
Patented Aug. 13, 1912.
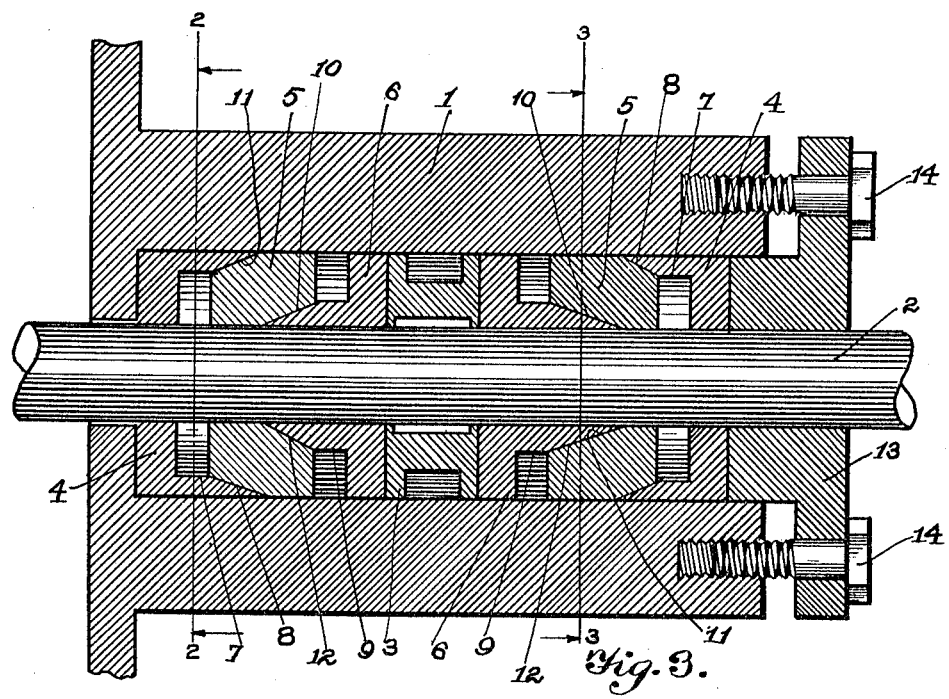
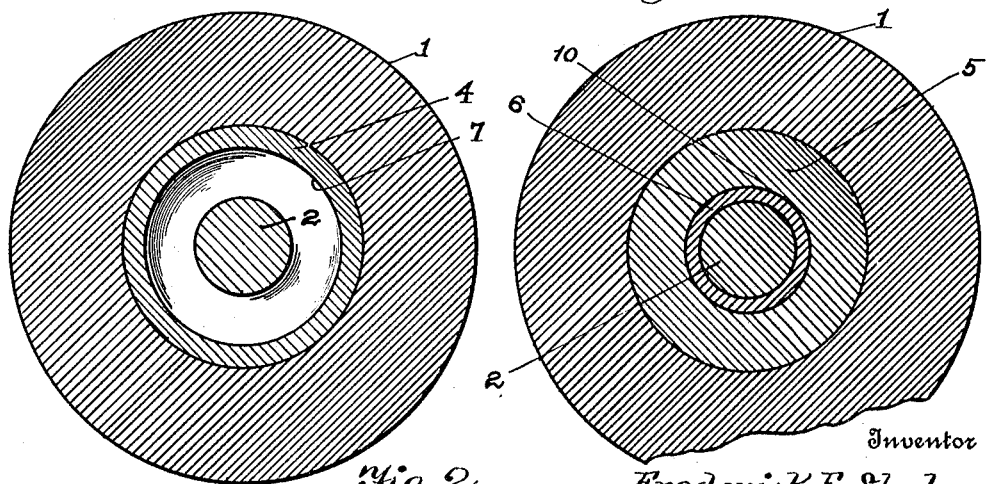
Inventor
Frederick E. Shahan.
By Joshua R. H. Potts
Attorney
Witnesses

UNITED STATES PATENT OFFICE.

FREDERICK E. SHAHAN, OF PHILADELPHIA, PENNSYLVANIA.

ROD-PACKING.

1,035,484.  Specification of Letters Patent.  Patented Aug. 13, 1912.

Application filed April 19, 1912. Serial No. 691,789.

*To all whom it may concern:*

Be it known that I, FREDERICK E. SHAHAN, a citizen of the United States, residing at Philadelphia, in the county of Philadelphia and State of Pennsylvania, have invented certain new and useful Improvements in Rod-Packings, of which the following is a specification.

My invention relates to improvements in rod packings, and more particularly to a packing designed primarily for use in connection with ammonia compressors, the packing designed to effectually pack the stuffing box and the rod, to prevent any possibility of leakage.

A further object is to provide a packing of this character which may be manufactured at a reasonably low price, and which is capable of a wide range of adjustment so that it will be long lived in the stuffing box.

With these and other objects in view, the invention consists in certain novel features of construction and combinations and arrangements of parts, as will be more fully hereinafter described and pointed out in the claims.

In the accompanying drawings: Figure 1, is a view in longitudinal section through a stuffing box illustrating my improved packing therein. Fig. 2, is a view in section on the line 2—2 of Fig. 1, and Fig. 3, is a view in section on the line 3—3 of Fig. 1.

1, represents a stuffing box, and 2 a rod extending therethrough. In the stuffing box I have illustrated two complete packing units located at opposite sides of an oil ring 3. What I term a packing unit consists of three rings 4, 5, and 6. All of these rings are of metal, and ring 4 is provided at its outer edge with an annular flange 7 having a beveled inner face 8. The ring 6 is provided around its rod receiving opening with a flange 9 having an outer beveled face 10. The ring 5, at one end, is provided with an outer beveled face 11, and at its other end has an inner beveled face 12. The beveled faces 11 and 12 are in engagement with the beveled faces 8 and 10 respectively, so that when the rings 4 and 6 are forced toward each other, ring 5 operates to press the flange 7 outwardly in tight engagement with the inner face of the stuffing box, and at the same time presses the flange 9 inwardly in close engagement with rod 2. An ordinary gland 13 is secured in the end of the stuffing box by bolts 14, and when this gland is forced inwardly by the bolts, the packing rings will be expanded and contracted as above described, so as to effectually pack the rod.

My improved packing operates to prevent leakage both at the rod and at the wall of the stuffing box, and this is effectually accomplished by the arrangement of rings and beveled faces. While, I have shown two packing units, the invention is of course not limited to any particular number.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A rod packing comprising three rings, all of said rings having rod receiving openings therein, one end ring at its outer edge having a ring flange projecting toward the other ring and internally beveled, the other of said rings having a ring flange around its central opening projecting toward the first-mentioned ring and externally beveled, and the third ring positioned between the first-mentioned rings and having its inner and outer faces beveled fitting against the beveled flanges of the said rings, substantially as described.

2. A rod packing comprising three rings, all of said rings having rod receiving openings therein, one end ring at its outer edge having a ring flange projecting toward the other ring and internally beveled, the other of said rings having a ring flange around its central opening projecting toward the first-mentioned ring and externally beveled, and the third ring positioned between the first-mentioned rings and having its inner and outer faces beveled fitting against the beveled flanges of the said rings, all of said beveled faces parallel, and means for forcing the first-mentioned rings toward each other, whereby the bevel of the intermediate ring serves to force the first-mentioned flange outwardly and the last-mentioned flange inwardly, substantially as described.

3. A rod packing comprising three rings, said rings having central openings of the same diameter, and all of said rings of the same external diameter, flanges on the end rings projecting toward each other, the flange of one ring at its central opening and the flange of the other ring around its outer edge, said flanges having parallel beveled walls, and the third ring having its inner and outer faces beveled parallel with the bevel of the flanges, substantially as described.

In testimony whereof I have signed my name to this specification in the presence of two subscribing witnesses.

FREDERICK E. SHAHAN.

Witnesses:
RICHARD HOULT,
JAMES C. PETERSON.

Copies of this patent may be obtained for five cents each, by addressing the "Commissioner of Patents, Washington, D. C."